United States Patent [19]
Heinemann

[11] Patent Number: 5,828,699
[45] Date of Patent: Oct. 27, 1998

[54] AUTOMATIC DIFFERENTIAL ABSOLUTE TIME DELAY EQUALIZER

[75] Inventor: James J. Heinemann, Los Altos, Calif.

[73] Assignee: Harris Corporation, Melbourne, Fla.

[21] Appl. No.: 792,426

[22] Filed: Jan. 30, 1997

[51] Int. Cl.⁶ .............................. H03H 7/30; H03H 5/00; H04B 1/10; H04B 1/06
[52] U.S. Cl. ..................... 375/230; 375/22.9; 375/257; 375/347; 455/303; 455/276.1; 333/28 R; 333/142
[58] Field of Search ...................... 375/230, 285, 375/296, 229, 347; 455/303, 305, 276.1; 333/28 R, 142, 144, 139

[56] References Cited

U.S. PATENT DOCUMENTS

| | | | |
|---|---|---|---|
| 4,052,670 | 10/1977 | Watanabe et al. | 370/324 |
| 4,354,276 | 10/1982 | Karabinis | 455/139 |
| 4,616,364 | 10/1986 | Lee | 375/202 |
| 4,969,207 | 11/1990 | Sakamoto et al. | 455/134 |
| 5,038,403 | 8/1991 | Leitch | 455/51 |
| 5,263,189 | 11/1993 | Kultgen et al. | 455/276.1 |
| 5,506,586 | 4/1996 | Bull | 342/148 |
| 5,530,925 | 6/1996 | Garner | 455/273 |
| 5,663,735 | 9/1997 | Eshenbach | 342/357 |

Primary Examiner—Chi H. Pham
Assistant Examiner—Khai Tran
Attorney, Agent, or Firm—Rogers & Killeen

[57] ABSTRACT

A circuit and method for automatically reducing an electrical path length difference between two electromagnetic signal paths. A counter converts the electrical path length difference to a multi-bit digital signal, and each bit in the signal operates a different one of plural switches which selectively inserts a time delay into one of the two electromagnetic signal paths to reduce the electrical path length difference. A comparator determines whether the electrical path length difference exceeds a threshold. The rectified AC component of a phase detector output is fed to the comparator which activates the counter when the threshold is exceeded. The counter drives the switched time delays in a sweeping fashion until the detected error falls below the threshold, whereupon the sweeping action is terminated.

22 Claims, 2 Drawing Sheets

AUTOMATIC DIFFERENTIAL ABSOLUTE TIME DELAY EQUALIZER

BACKGROUND OF THE INVENTION

The present invention relates to time delay equalizers, and more particularly to an automatic time delay equalizer and method for a space diversity receiver.

A space diversity receiver receives the same signal at different locations which may be separated by 100 feet or more, and includes a summing circuit for combining two received signals coherently in phase (as used herein, the reference to two signals refers to the same signal received at two different locations). Typically the summing circuit operates at an intermediate frequency (IF), although the specific frequency of the two signals which are summed is not of importance to the present invention: the phases of the two signals are, and both must be the same frequency.

The received signals are provided to the summing circuit in two signal paths which are desirably of equal length to avoid any significant time delay difference, and thus a phase difference, between the signals. For example, IF combining in space diversity receivers usually requires that the electrical length of both paths be within a few nanoseconds at 70 MHz. The signals in the two paths may be out of phase even when the physical path lengths are the same due to propagation condition difference.

Where the phase difference is small, such as due to a propagation condition difference, a small phase shift may be inserted into the signal path with the shorter length to equalize the phase. A DC component of a signal derived from a phase detector is typically used for this purpose. The DC component provides an appropriate correction when the phase difference is less than 180°, but the DC component fails to provide the needed correction when the phase difference exceeds 180° because of the cyclic nature of the signal. That is, it cannot distinguish between a 360° difference and a 720° difference.

When the difference exceeds 180° due to a known difference in the signal path lengths, the prior art suggests inserting a fixed time delay into the signal path with the shorter length to bring the difference within the range at which the DC component from the phase detector is effective. A time delay may be inserted into the shorter path by using cable runs of precise length. This is a time consuming process which requires a technician and test equipment. See, for example, the fixed delay 15 in FIG. 1 of U.S. Pat. No. 4,354,276 to Karabinis.

What is needed is a system which automatically compensates for differences in electrical path lengths and which is useful in space diversity combiners. One automatic compensation system applies a special test signal to one antenna element, and thus is not useful for space diversity combiners. See, U.S. Pat. No. 5,263,189 to Kultgen, et al.

In a preferred embodiment, the present invention automatically inserts a time delay into the shorter path length by converting a signal path length difference into a multi-bit digital signal, where each bit in the multi-bit signal operates a different time delay circuit which inserts a time delay into the shorter path and where the total time delay inserted approximates the time delay corresponding to the path length difference.

Accordingly, it is an object of the present invention to provide a novel method and system for automatically inserting a time delay which obviates the problems of the prior art.

It is another object of the present invention to provide a novel method and circuit for reducing an electrical path length difference between two electromagnetic signal paths by converting an electrical path length difference between the two paths to a multi-bit digital signal, and selectively inserting one or more time delay circuits into the shorter of the two paths, each of the bits in the multi-bit signal for selecting one of the time delay circuits.

It is yet another object of the present invention to provide a novel method and circuit for reducing an electrical path length difference between two signal paths by converting an electrical path length difference between the two paths to a rectified AC component of a phase detector signal which is compared to a threshold to determine whether correction is needed, and in which the magnitude of the rectified AC component activates a circuit that changes a multi-bit digital signal, the bits of which are used to insert one or more time delay circuits into the shorter of the two paths.

It is still another object of the present invention to provide a novel circuit and method for reducing an electrical path length difference between two electromagnetic signal paths in which an up/down counter converts the electrical path length difference into a multi-bit digital signal, and in which time delay circuits are inserted into one of the two paths to reduce the electrical path length difference, each of the circuits being operated by a corresponding transistor switch which is in turn operated by one of the bits in the multi-bit signal.

It is a further object of the present invention to provide a novel automatic differential time delay equalizer which includes a phase detector for detecting a phase/time delay difference between signals in two electromagnetic signal paths, a rectifier for converting an AC component of the detected phase/time delay difference to a signal whose magnitude corresponds to the phase/time delay difference, an up/down counter for converting the rectified AC component to a seven bit digital signal corresponding to the magnitude of the time delay error, and seven delay circuits each operated by a different one of the seven bits and for inserting a different time delay into one of the two electromagnetic signal paths so as to reduce the electrical path length difference by up to 127 nanoseconds.

It is yet a further object of the present invention to provide a novel method and circuit for reducing a path length difference between two signal paths by converting the path length difference between the two paths into a rectified AC component of a phase detector output which is converted to a multi-bit digital signal, the bits of which are used to insert one or more time delay circuits into the shorter of the two paths to correct large phase/time delay differences, and also by converting the path length difference to the DC component of the phase detector output which is used to correct small phase differences.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
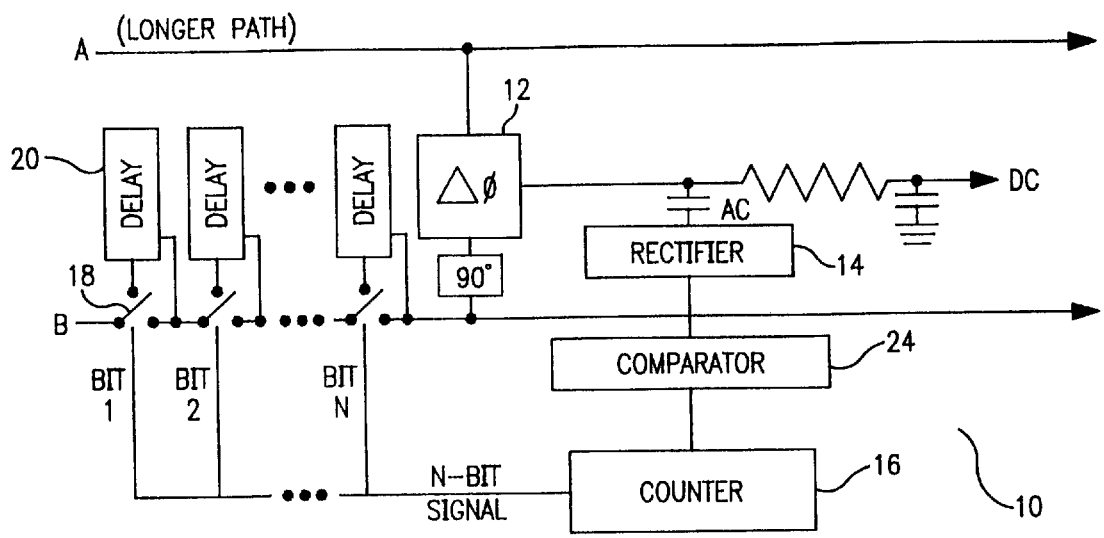
FIG. 1 is a block diagram of an embodiment of the present invention.

With reference now to FIG. 1, an embodiment 10 of the present invention may include two electromagnetic signal paths, A and B, one of which is shorter so to cause a phase/time delay difference between signals in the two paths. The phase/time delay difference may be detected by phase detector 12 which receives inputs from both paths A and B. The signal provided from path B to phase detector 12 may be phase shifted 90° in a wideband phase shifter.

Phase detector 12 provides a DC output proportional to a phase difference between signals in the two paths, although the DC voltage will be zero when the phase difference is 180n°, n being an integer. Phase detector 12 also provides an AC output at the modulation symbol rate. When the phase and time delay differences are zero both the DC and AC components of the signal will be zero. As the phase difference increases the DC component may be zero again, but the AC component will not be zero. The DC component may be provided to the receiver's conventional small phase difference correction circuitry, typically found in the IF combiner.

The AC component may be rectified in rectifier 14 and thereafter provided to a comparator 24 which activates counter 16. Counter 16 converts the rectified AC signal to a multi-bit digital signal which corresponds to the magnitude of the time delay error. Each bit in the multi-bit signal may thereafter be used to control insertion of a particular time delay into the shorter path. For example, a bit position may correspond to a particular time delay in nanoseconds (e.g., bit 1 may control a 1 nanosecond delay circuit, bit 3 may control a 4 nanosecond delay circuit, bit 5 may control a 16 nanosecond delay circuit, and so on). Counter 16 may be a conventional up/down counter.

The multi-bit signal may be provided to switches 18 which operate respective time delay circuits 20. Each circuit 20 inserts a particular time delay into the shorter path when selected by its respective switch 18 which was, in turn, operated by a respective one of the bits in the multi-bit signal. The time delays may be chosen as needed for a particular application of the circuit of FIG. 1. Switches 18 may be conventional, such as double pole, double throw (DPDT) field effect transistors (FETs). Time delay circuits 20 may be conventional delay lines or coaxial cable. Ones skilled in the art will appreciate that other delay times, multi-bit signal sizes, switch types and delay circuit types may be used without departing from the present invention.

Figure 2:
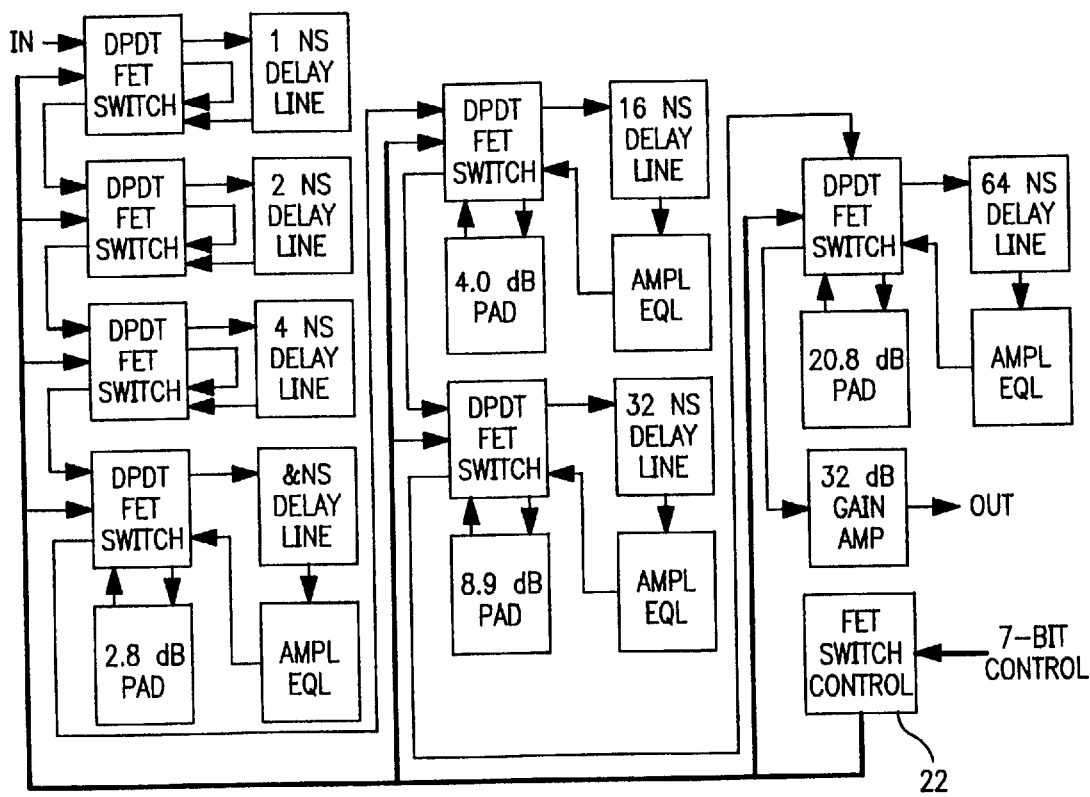
FIG. 2 is a block diagram of a further embodiment of the time delay circuitry of the present invention.

By way of example, and with reference to FIG. 2, a space diversity receiver with a 70 MHz IF combiner may include time delay circuitry with the arrangement of switches, delay lines and other components shown (amplifiers and equalizers being used conventionally). The multi-bit signal may be seven bits long and the corresponding seven time delays may be 1, 2, 4, 8, 16, 32 and 64 nanoseconds, so as to be able provide a selectable time delay of up to 127 nanoseconds in 1 nanosecond increments. The input IN is the shorter signal path, the seven bit TTL control signal CTRL provided to FET switch controller 22 is from counter 16 and is converted in controller 22 to the bias voltages required to operate the FET switches, and the output OUT is provided in a now (substantially) length equalized signal path which is tapped for connection to phase detector 12.

In a further embodiment of the present invention, the signal from rectifier 14 may be evaluated to determine whether path length correction is required. If the rectified AC component of the phase detector signal is small enough not to exceed a predetermined threshold (that is, the phase/time delay difference is small) counter 16 and the associated delay imparted by the selected ones of delay circuits 20 may be locked at their last settings and further changes disabled until the threshold is once again exceeded. To this end, and with reference again to FIG. 1, the rectified AC component of the phase detector signal may be provided to comparator 24 for comparison to a threshold level. So long as the threshold level is not exceeded, counter 16 and the associated time delay inserted into the shorter path are not changed. Once the threshold level is exceeded, counter 16 and delay circuits 20 resume operation to reduce the path length difference. In the example above, counter 16 may count up and down between zero and 127 as needed to bring the path length under the threshold level which may correspond to delays of several (e.g., 2–4) nanoseconds.

Figure 3:
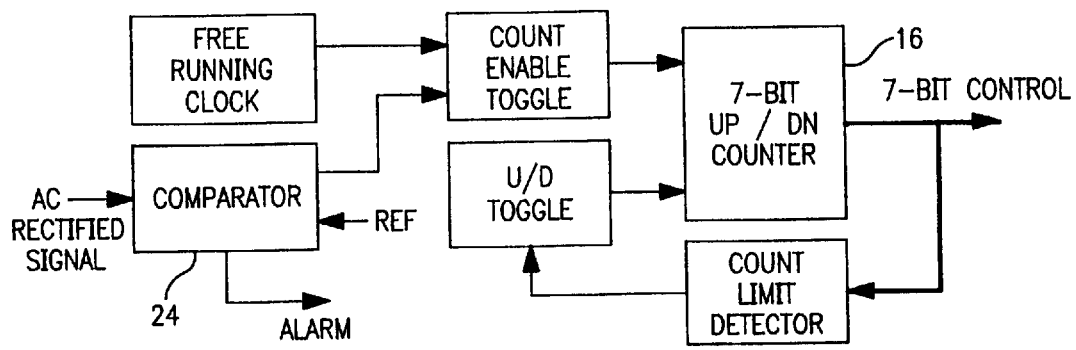
FIG. 3 is a block diagram of an embodiment of a comparator/counter connection of the present invention.

With reference now to FIG. 3, counter 16 and comparator 24 may be connected as shown. The features and operation of the components shown will be appreciated by those of skill in the art and need not be further explained.

Operation of the counter and delay circuitry may be implemented at system start-up when the receiver is receiving the modulated signal from the remote transmitter, and may be disabled (locked at the last setting) during transmission of message traffic. Operation may also be continuous if desired. When the counter and delay circuitry are locked, the receiver's normal small phase difference correction circuitry (e.g., a phase rotator) driven by the DC component of the phase detector signal may be used.

An understanding of the present invention may be facilitated by review of the following explanation of the background and operation of the present invention. The two signals being compared are actually the same signal split into two separate paths and then compared at the final destination. At the final destination it is desirable to realign the two modulated signals in phase and time so that they are as coherent as possible before recombining. As is known, at any given frequency a time delay corresponds to a phase difference. For example, at 70 MHz a time delay of 7.14 nanoseconds corresponds to a phase difference of 180°, and a time delay of 100 nanoseconds corresponds to a phase difference of 2520°. At a different frequency these time delays correspond to different phase differences. In a wideband system phase shift and time delay are not the same thing, but are proportional. A phase shift is acceptable for correcting only relatively small time delay errors. It is conventional practice to use phase rotators to correct small time delay errors. As time delay errors exceed the equivalent of 360° it has been more efficient to insert delay sections in the shorter path to achieve coherent equalization.

A preferred embodiment of the present invention uses both the AC and DC components of the phase detector output. The DC component is present even in the absence of modulation, is an indication of phase difference, is cyclic in nature and is proportional to the sine of the phase angle. The DC component is the control signal conventionally used in phase rotators. The AC component is a result of modulation of the signal. The AC component will be zero only when the two signals being compared are autocorrelated; that is, when both phase angle and time delay differences are zero.

As the phase or time delay difference increases between the two signals, the DC component will cyclically increase, decrease and pass through zero, etc., and the AC component will increase and remain non-zero. The DC component has a polarity indicating the direction of the error, and a feedback servo loop easily can correct the phase error so long as it is less than 180°. If the error is 180° or greater the phase locked loop can lock on the nearest multiple of 360°, each of which is 14.28 nanoseconds of delay at 70 MHz. The AC component has no direction sensing properties. At errors of 180° or greater (depending on the type of modulation on the carrier) the AC component is large enough to trigger a comparator which activates a sweep circuit that drives a correction circuit over a predetermined time delay range until the AC component drops below the comparator threshold, whereupon the sweep circuit stops at its current level. At that point the time/phase difference can be accurately fine tuned by the DC controlled phase rotator. When the comparator operates on DC signals (as comparators typically do), the AC component should be rectified before applying it to the comparator.

The invention has been described in relation to the shorter signal path assuming that it will always be the shorter path. As will be appreciated by those of skill in the art, the circuitry of the present invention may be duplicated on the other path for operation when it is the shorter path in the event the invention is used in a system in which either path may be the shorter path.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of reducing an electrical path length difference between two electromagnetic signal paths comprising the steps of:
    (a) converting an electrical path length difference between two electromagnetic signal paths to a multi-bit digital signal; and
    (b) selectively inserting one or more time delay circuits into one of the two electromagnetic signal paths using the bits in the multi-bit digital signal to reduce the electrical path length difference, each of the bits for selecting one of the time delay circuits.

2. The method of claim 1 wherein the selected time delay circuits provide a total time delay approximating a time period corresponding to the electrical path length difference.

3. The method of claim 1 wherein the step of converting the electrical path length difference to the multi-bit digital signal comprises the steps of generating an activation signal corresponding to an AC component of a phase difference between modulated signals in the two electromagnetic signal paths, providing the activation signal to a counter, and providing the multi-bit digital signal as an output from the counter.

4. A method of reducing an electrical path length difference between two electromagnetic signal paths comprising the steps of:
    (a) converting an electrical path length difference between two electromagnetic signal paths to a multi-bit digital signal, each bit in the multi-bit digital signal for indicating one of plural time delays, the indicated time delays providing a total time delay which reduces the electrical path length difference;
    (b) selecting one or more time delay circuits using the bits in the multi-bit digital signal, each of the selected time delay circuits for delaying a signal traveling therethrough by one of the plural time delays; and
    (c) inserting the selected time delay circuits into one of the two electromagnetic signal paths so as to reduce the electrical path length difference.

5. The method of claim 4, prior to step (a), further comprising the steps of:
    converting an AC component of a phase/time delay difference between modulated signals in the two electromagnetic signal paths to an activation signal; and
    performing steps (a) through (c) when a magnitude of the activation signal exceeds a threshold.

6. The method of claim 5 wherein the step of converting the electrical path length difference to the multi-bit digital signal comprises the steps of providing the AC component to a comparator which activates a counter, and providing the multi-bit digital signal as an output from the counter.

7. The method of claim 5 further comprising the steps of converting the phase/time delay difference to a DC output, and using the DC output to reduce the phase/time delay difference when the phase/time delay difference is less than 180°.

8. The method of claim 4 wherein the multi-bit digital signal is a seven bit signal and the plural time delays are from 1 to 64 nanoseconds, whereby the total time delay may reach 127 nanoseconds.

9. The method of claim 4 wherein the step of selecting one or more time delay circuits using the bits in the multi-bit digital signal comprises the step of activating a switch with one of the bits to select one of the time delay circuits for insertion into the one of the two electromagnetic signal paths.

10. The method of claim 4 wherein the indicated time delays provide a total time delay approximating a time period corresponding to the electrical path length difference.

11. A method of reducing an electrical path length difference between two electromagnetic signal paths comprising the steps of:
    (a) detecting a time delay difference between signals in the two electromagnetic signal paths;
    (b) converting an AC component of the detected time delay difference to a rectified AC signal;
    (c) providing the rectified AC signal to a comparator for determining whether it exceeds a threshold; and when the threshold is exceeded,
    (d) providing a multi-bit digital signal which corresponds to a magnitude of the time delay difference; and
    (e) selectively inserting one or more time delay circuits into one of the two electromagnetic signal paths using the bits in the multi-bit digital signal.

12. The method of claim 11 wherein a total time delay of the selected time delay circuits delays a signal traveling therethrough by a period approximating the time delay difference.

13. The method of claim 11 further comprising the steps of converting the time delay difference to a DC output and using the DC output to reduce a phase difference between the signals when the phase difference is less than 180°.

14. A circuit for reducing an electrical path length difference between two electromagnetic signal paths comprising:
    a counter for converting an electrical path length difference between two electromagnetic signal paths to a multi-bit digital signal;
    plural time delay circuits; and
    plural switches, each for inserting one of said time delay circuits into one of the two electromagnetic signal paths to reduce the electrical path length difference, each of said plural switches being operated by one of the bits in the multi-bit digital signal.

15. The circuit of claim 14 further comprising a comparator for determining whether the electrical path length difference exceeds a threshold, said comparator having an output for activating said counter when the threshold is exceeded.

16. The circuit of claim 15 further comprising means for providing a rectified AC signal whose magnitude corresponds to an AC component of a phase/time delay difference between modulated signals in the two electromagnetic signal paths, the AC component for being provided to said comparator for comparison to the threshold.

17. A differential time delay equalizer for reducing an electrical path length difference between two electromagnetic signal paths comprising:

a phase detector for detecting a phase/time delay difference between signals in two electromagnetic signal paths;

a rectifier for converting an AC component of the detected phase/time delay difference to a rectified AC signal whose magnitude corresponds to a time delay difference that results in a phase difference of 180° or more;

an up/down counter for converting the rectified AC signal to a multi-bit digital signal corresponding to the magnitude of the time delay difference; and plural delay circuits, each for inserting a time delay into one of the two electromagnetic signal paths so as to reduce the electrical path length difference, each of said delay circuits having a corresponding switch operated by a different one of the bits in the multi-bit digital signal.

18. The equalizer of claim 17 further comprising a comparator for comparing the rectified AC signal to a threshold, and for providing a disable signal for stopping selection of said delay circuits in the event the threshold is not exceeded.

19. The equalizer of claim 17 further comprising means for converting the phase/time delay difference to a DC signal, the DC signal for reducing the phase difference when the phase difference is less than 180°.

20. The equalizer of claim 17 wherein each said switch comprises a transistor.

21. The equalizer of claim 20 wherein each said transistor comprises a DPDT FET switch.

22. The equalizer of claim 17 wherein said delay circuits each comprise a delay line for delaying the signal by a time period of 1 to 64 nanoseconds.

\* \* \* \* \*